Dec. 3, 1968   H. A. ECKHARDT   3,414,168
APPARATUS FOR FEEDING PARTICULATE MATERIALS
Filed Aug. 29, 1966   5 Sheets-Sheet 1

INVENTOR.
HANS A. ECKHARDT
BY Samuelson & Jacob
HIS ATTORNEYS.

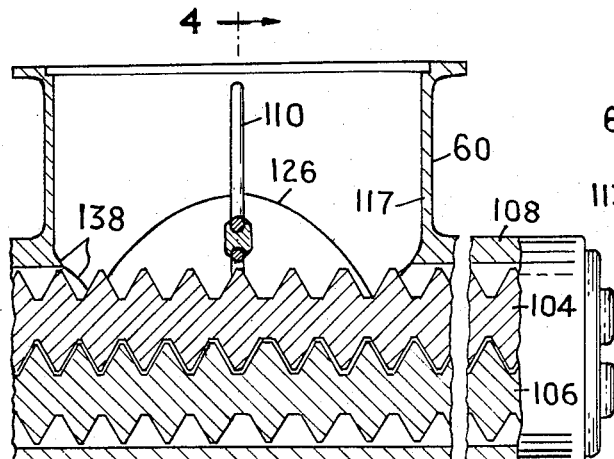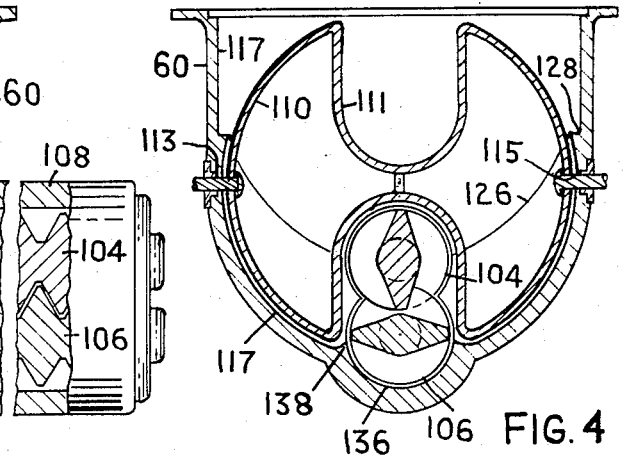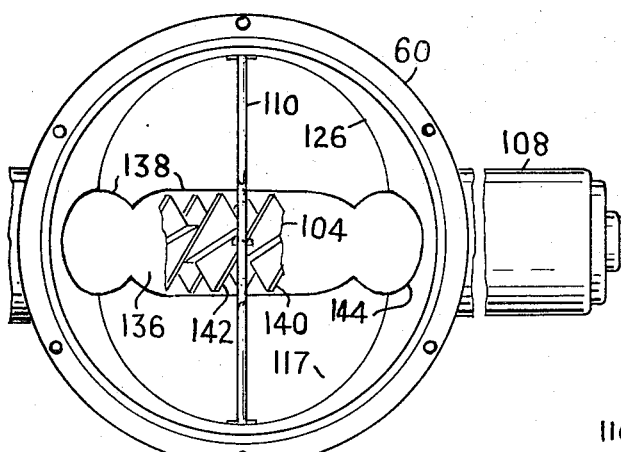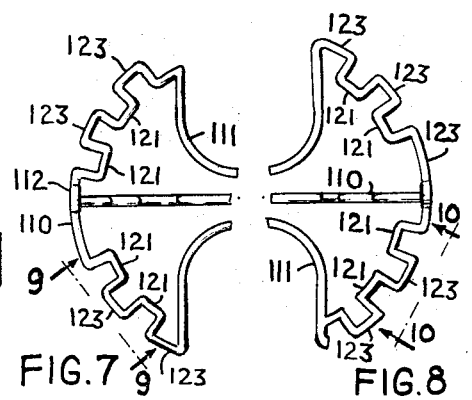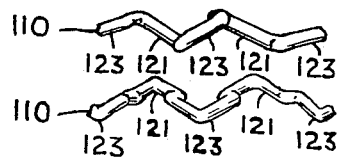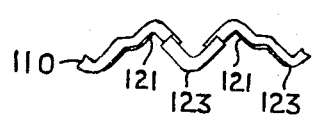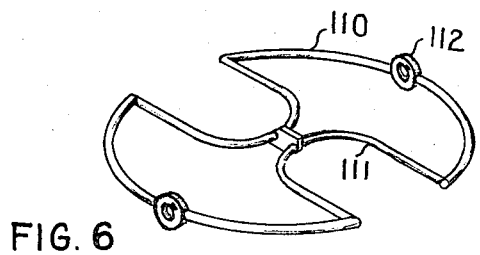

Dec. 3, 1968　　　　H. A. ECKHARDT　　　　3,414,168
APPARATUS FOR FEEDING PARTICULATE MATERIALS
Filed Aug. 29, 1966　　　　　　　　　　　5 Sheets-Sheet 3
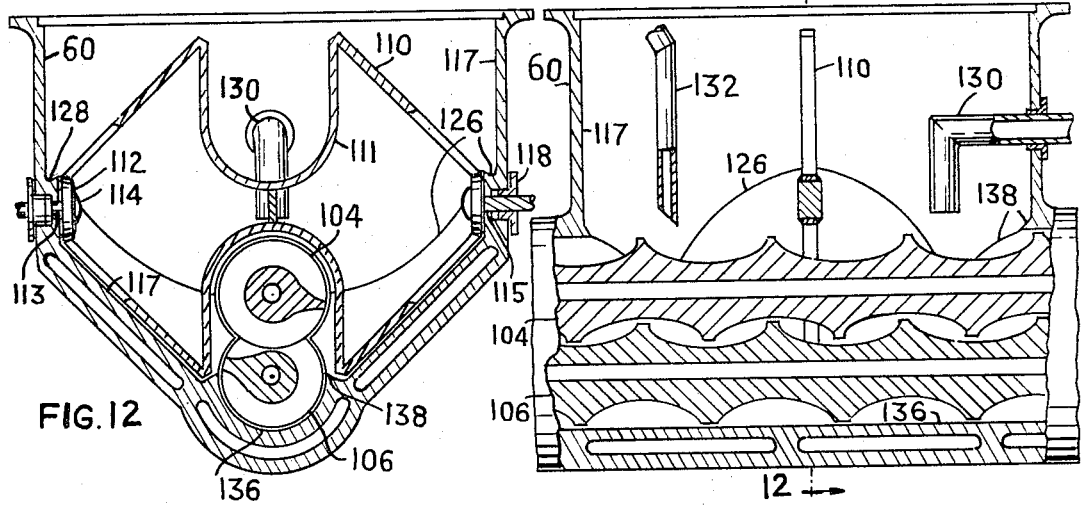
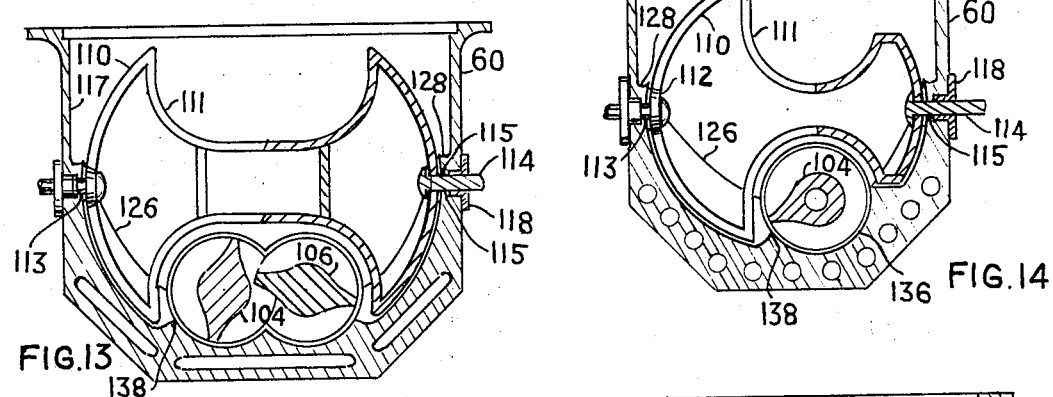
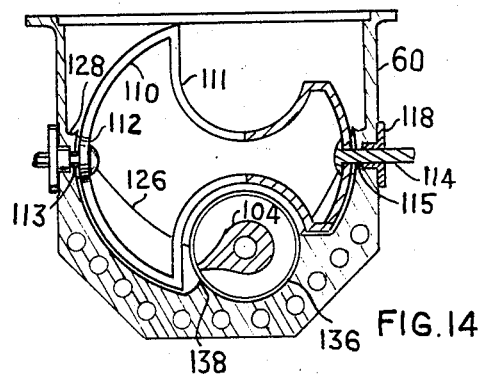
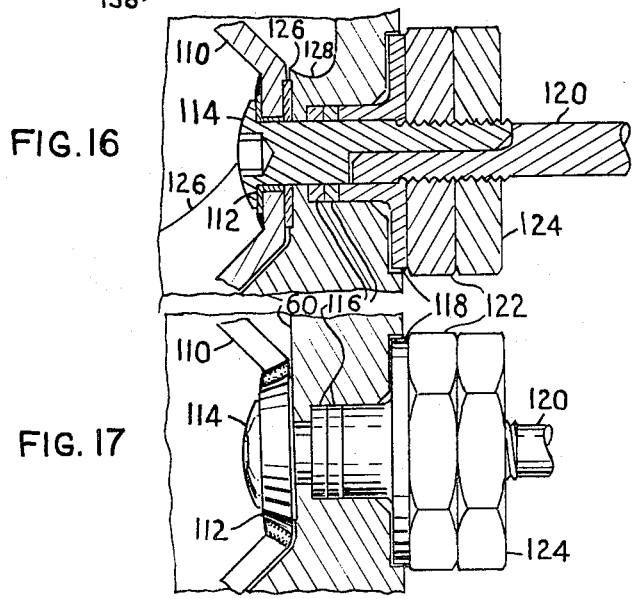
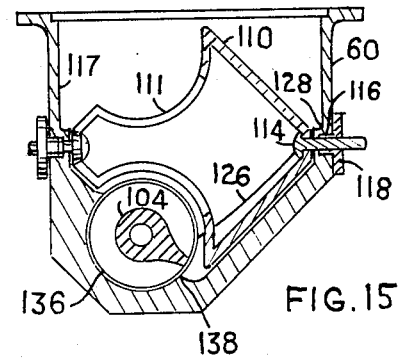
INVENTOR.
HANS A. ECKHARDT
BY
HIS ATTORNEYS.

Dec. 3, 1968 H. A. ECKHARDT 3,414,168
APPARATUS FOR FEEDING PARTICULATE MATERIALS
Filed Aug. 29, 1966 5 Sheets-Sheet 4

INVENTOR.
HANS A. ECKHARDT
BY
*Samuelson & Jacob*
HIS ATTORNEYS

Dec. 3, 1968  H. A. ECKHARDT  3,414,168

APPARATUS FOR FEEDING PARTICULATE MATERIALS

Filed Aug. 29, 1966  5 Sheets-Sheet 5

INVENTOR.
HANS A. ECKHARDT
BY Samuelson & Jacob
HIS ATTORNEYS.

United States Patent Office 3,414,168
Patented Dec. 3, 1968

3,414,168
APPARATUS FOR FEEDING
PARTICULATE MATERIALS
Hans A. Eckhardt, 55 Crescent Bend,
Allendale, N.J. 07401
Filed Aug. 29, 1966, Ser. No. 575,667
19 Claims. (Cl. 222—227)

ABSTRACT OF THE DISCLOSURE

An apparatus for feeding particulate materials with a throat in the lower portion of a compartment and a rotatable screw extending through the lower portion of the throat, has in the throat a bail-like rotor, without supporting axle, crimped in two planes, which wipes alternatingly the inner surface of the throat and the periphery of the screw. The bail-like rotor approaches the inner throat surface at a ridge running from above the rotor's mounting point downward. The ridge of less than 90° is formed between the groove behind the ridge and the inner surface of the throat below the ridge.

---

The present invention relates to apparatus for feeding particulate materials and in particular, to such apparatus which may be used to feed such materials which are cohesive or sticky and have a tendency to form deposits on the walls of the apparatus or to bridge. Apparatus of the invention improves the feeding of such materials which contain hard or tough particles, pellets or granules. The invention is particularly adapted to but not limited to providing improvements in such apparatus and in various portions of apparatus which is used for conveying, mixing, homogenizing, devolatilizing, extruding, separating, pulverizing or otherwise treating such materials.

The invention is directed toward providing improvements in the feed apparatus to be mounted in the compartment (duct or hopper) or in the throats of such compartments. It is also directed toward improving the feed screws of such apparatus to prevent jamming of the hard granular material between the screw flights and the throat with consequent damage to the apparatus or interruption of the operation. Moreover, the invention is directed toward providing improvements in feeding apparatus for both finer and coarser particulate material and toward providing an uninterrupted, steady feed of such material through the apparatus.

Great difficulties are encountered when charging moist, tacky, pulverulent, granular or flaky materials into machines such as conveyors, extruders, dryers or mixers. This is due to the tendency of these materials to stick to the walls of the feed compartment (hopper or duct) and of the throat and to form bridges that prevent or at the very least impede the free, steady flow of material.

Various attempts have been made to overcome some or all of these disadvantages. One such technique involved the vibrating of the feed hopper or duct and the throat in order to keep the material moving through the compartment and the throat. Unfortunately, these vibrating devices often shake the material into such a state that the particles stick and cohere even more than they did without the vibration and the vibration often causes damage to the bearings and other parts of the machine.

Another prior art technique makes use of spikes or paddles which rotate around a vertical or horizontal axis which is either identical with or transverse to the axis of the compartment or the throat. The rotating spikes or paddles fail to properly move the material near the center or near the compartment walls so that a steady flow is not attained. Some other prior art devices use rods that wipe the walls of the compartment and rotate around an axis which is identical with the compartment axis. In such cases, the material has a tendency to stick to the portion of the compartment which has just been wiped by the rod. The material packs when this type of device is used in conical hoppers due to the force of gravity acting on the contents of the hopper. Furthermore, none of these prior art rod networks had provisions for pulling in the material at the entrance, pushing it out at the exit and moving the material from the compartment walls toward the center of the compartment.

Some prior art auxiliary machines, which are mounted in the compartment and which comprise a single screw have been used to expedite the flow of the material in the compartment. However, the material often sticks to the screw surfaces and rotates with the screw thereby further interrupting the flow of the material. Furthermore, these devices often squeeze the air out of the material which worsens the flow characteristics of the material. As a consequence, aeration of the material is one means for improving the material's flow properties. To overcome this disadvantage, multiple screw machines have been installed in the compartment but these machines were very sensitive and hard to adjust in speed because of the many variables affecting their operation. Moreover, these multiple screw, auxiliary machines are expensive to manufacture, maintain and clean.

Another prior art device with the same objective incorporates one or more horizontal rotating shafts on which are mounted one or more blades. These systems leave the contents in the central area of the compartment (hopper or duct) and of the throat stagnant and unaffected. Moreover, the tendency of the material to bridge is increased because of the existence of the relatively heavy, horizontal shafts which are mounted transversely of the compartment or throat. In order to wipe more than a fraction of the compartment and throat surfaces, these hoppers and throats have been made with an irregularly shaped (such as octagonal) horizontal cross-section. Such compartments are not only difficult and expensive to manufacture but also are hard to adapt to the commonly used round, square or rectangular cross-sections which are usually employed in the industry.

Even if some of the above disadvantages are remedied by using blades on only one side of the throat to thereby avoid the transverse shaft, severe difficulties are encountered when materials containing coarse and tough particles such as granules and pellets are processed. These particles are caught between the blades and the throat's inner walls in the wedge-shaped spaces which are formed by every blade arm during each revolution. This causes jamming, a shut-down of the operation and, often, severe damage to the equipment.

Prior art feed screws, which are used in apparatus for feeding particulate material, are subjected to damage when coarse, tough materials such as pellets are being fed to them. The results are not only excessive abrasion, but also damage to the screw threads. Moreover, the metal particles torn off the screw often contaminate the processed material.

Accordingly, it is an important object of the invention to provide improved apparatus which feeds such types of particulate materials uniformly and efficiently.

It is a further object of the invention to provide such improved apparatus with an improved, continuous, bail-like agitator in the throat of the compartment (hopper or duct) which wipes the interior or inner walls clean of all the material.

It is a still further object of the invention to provide such an agitator which is crimped in one or more directions with respect to the plane of the bail-like member.

It is a still further object of the invention to provide such an agitator which does not have a supporting member coinciding with the axis of rotation of agitator, and whose axis of rotation is skew to the axis of rotation of the feed screw.

It is a still further object of the invention to provide a ridge in the interior surface of the throat of the compartment so that a groove is formed in the surface and the angle between the groove and the interior surface below this ridge is not more than 90°.

It is a still further object of the invention to provide such improved apparatus wherein the angle of intersection between the inner surface of the throat surrounding the feed screw with close clearance and the inner surface of the throat approaching the screw is not more than 90°.

It is a still further object of the invention to provide a feed screw for apparatus for feeding particulate material wherein the angle between the leading edge surface of the helical flight and the crest surface of the helical flight is less than 90°.

It is a still further object of the invention to provide a feed screw for such apparatus wherein there are one or more grooves in the crest of the helical flight running between the leading edge and the trailing edge such that the opening in the trailing edge is greater than that in the leading edge.

It is a still further object of the invention to provide a feed screw for such apparatus wherein the pitch of the portion of the flight provided with the grooves is greater than that of the immediately adjacent portion of the flight.

It is a still further object of the invention to provide an improved stirrer mounted in the compartment above the throat, which stirrer comprises a network of rigid members rotatable about a vertical axis, a top and a bottom impeller pitched out of their horizontal planes, an outer member connected between the two impellers to wipe the surface of the compartment, and an intermediate member which is pitched upwardly toward the vertical axis of the network to force the material downwardly toward the throat.

These and other objects, advantages, features and uses will be apparent during the course of the following description when taken in connection with the accompanying drawings, wherein:

FIGURE 3 is an elevational view, partly in section, of the throat and feed screws of an embodiment of the invention;

FIGURE 4 is a sectional view, taken on the lines 4—4 of FIGURE 3, viewed in the direction of the arrows;

FIGURE 5 is a plan view of the embodiment of FIGURE 3, viewed from the top of the throat, showing portions of the feed screw broken away;

FIGURE 6 is a perspective view of the agitator which is used in the embodiment of FIGURE 3;

FIGURES 7 and 8 are plan views of half of alternate embodments of agitators which may be used in the apparatus of the invention;

FIGURES 9 and 9a are alternative views taken along the lines 9—9 of FIGURE 7, viewed in the direction of the arrows;

FIGURE 10 is a view taken along the lines 10—10 of FIGURE 8, viewed in the direction of the arrows;

FIGURE 11 is a view, similar to that of FIGURE 3, of a further embodiment of the invention;

FIGURE 12 is a sectional view taken along the lines 12—12 of FIGURE 11, viewed in the direction of the arrows;

FIGURES 13, 14 and 15 are views, similar to that of FIGURE 12, of still further embodiments of the invention;

FIGURES 16 and 17 are enlarged, partly sectional, views of a hub section used with the apparatus of the invention;

Broadly, the apparatus of the invention operates in the following manner: particulate material is fed into the top of the compartment, either through a compartment extension or directly from a storage bin or conveyor. If the material particles are fine, the material is stirred by a stirrer which is mounted in the compartment and which rotates about a vertical axis. The construction of the stirrer is such that there is no supporting member coinciding with or coincident with the axis of rotation.

The construction of the stirrer is such that the material is moved vertically downward and inward from the compartment walls. If coarse, free-flowing particles are being processed, the stirrer of the invention may be dispensed with.

The material drops down from the compartment to the throat. The throat is mounted in such relationship to the feed screw so that the material is discharged from the throat onto the feed screw. An agitator is mounted in the throat so that it is rotatable about an axis which is skew to that of the feed screw. The agitator is a continuous, bail-like member and is constructed such that there is no supporting member coincident with or coinciding with the axis of rotation.

Preferably, the agitator is crimped so that all portions of the inner or interior surface of the throat are wiped by it. The shape of the agitator is such that it avoids contact with the feed screw and permits the feeding of materials (such as additives) directly into the throat above the feed screw.

When hard, coarse particles are being processed, it is best to provide a ridge on the inner surface of the throat so that the particles do not jam between the agitator and the inner wall of the throat. The helical flight on the feed screw is also modified in accordance with the invention to facilitate the movement of coarse particulate material.

Figure 1:
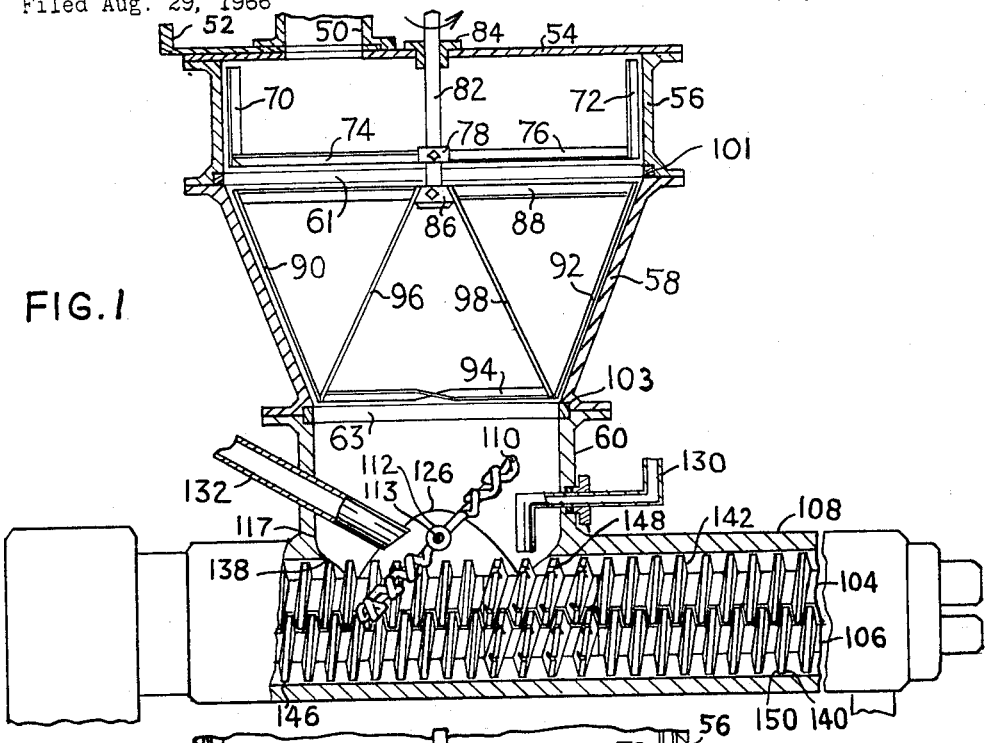
FIGURE 1 is an elevational view, partly in section showing one embodiment of the apparatus of the invention.

In the drawings, wherein for the purpose of illustration, are shown various embodiments of the invention, and wherein like numerals designate similar parts throughout the same, the numeral 50 designates a tube through which the material is fed when the slide valve 52 is in the open position, as shown in FIGURE 1. Tube 50 and slide valve 52 are mounted on the cover 54 of the compartment extension 56 which is mounted on top of the compartment 58.

Throughout this description, I have used one number to designate a particular functional part even though a functional part on one figure differs slightly in construction from the same functional part on another figure. It is believed that greater clarity, brevity and understanding are obtained in this manner than by the use of a different numeral to designate each change in the same functional part.

Figure 2:
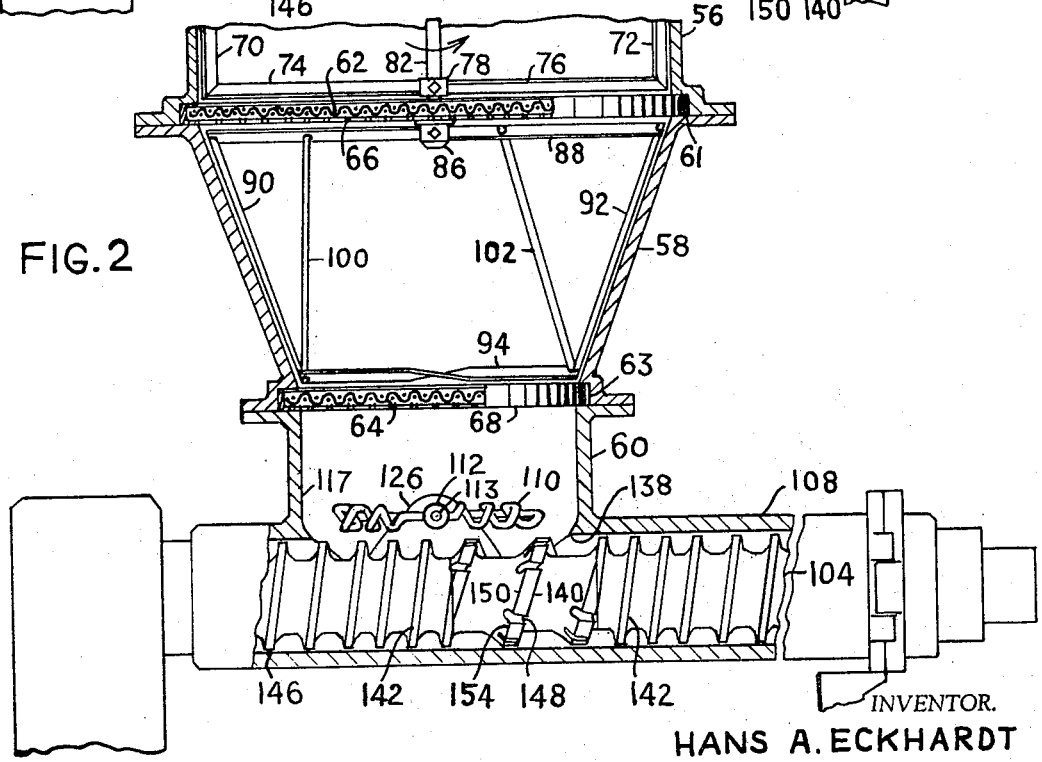
FIGURE 2 is a view similar to that of FIGURE 1 showing a second embodiment of the apparatus of the invention.
Figure 18:
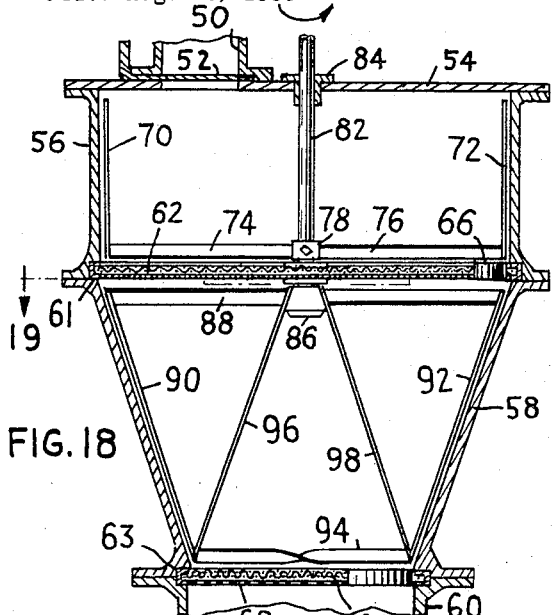
FIGURE 18 is a vertical section of a hopper which may be used with the apparatus of the invention.

Screens 62 and 64 are respectively mounted between the compartment extension 56 and the compartment 58 and between the latter and the throat 60 (FIGURES 2 and 18). Screens 62 and 64 are supported in screen frames 66 and 68, respectively. The screen frames 66 and 68 are perforated and can be removed quickly by sliding them out from the recesses 61 and 63, respectively, which are provided to receive them. Another screen frame with a new screen may be inserted in the recess, as required.

The inside of compartment extension 56 is wiped by the two vertical blades 70 and 72 which are mounted on the ends of horizontal blades 74 and 76 which in turn are connected by means of bushing 78 to the rotatable shaft 82.

Figure 21:
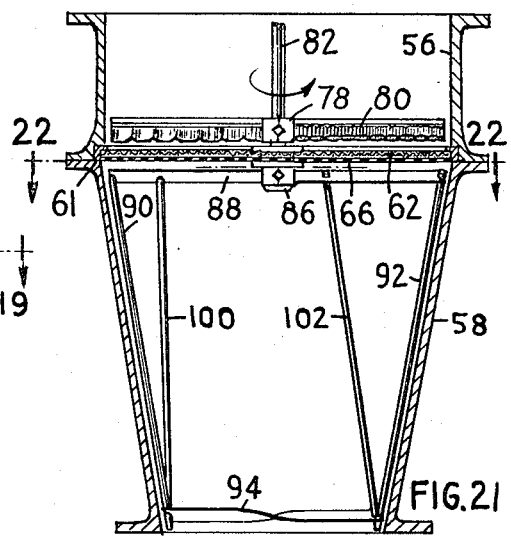
FIGURE 21 is a view, similar to that of FIGURE 18, of a further embodiment of hopper used with the apparatus of the invention.

When less tacky material is being processed, the blades 74 and 76 may be replaced by a sifter brush 80 and the blades 70 and 72 may be omitted (FIGURE 21).

The shaft 82 is mounted rotatably and is driven from its upper end in a manner well-known in the art (not shown). It enters compartment extension 56 through a sealing block 84 which seals against dust, and which may contain a bearing (not shown).

Head 86 which carries the top impeller 88 is attached to the lower end of shaft 82. Top impeller 88 is connected on its outer ends by the outer members 90 and 92 to the outer ends of the bottom impeller 94.

Figure 22:
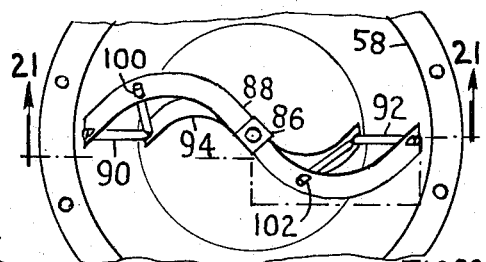
FIGURE 22 is a sectional view taken along the lines 22—22 of FIGURE 21, viewed in the direction of the arrows.
Figure 23:
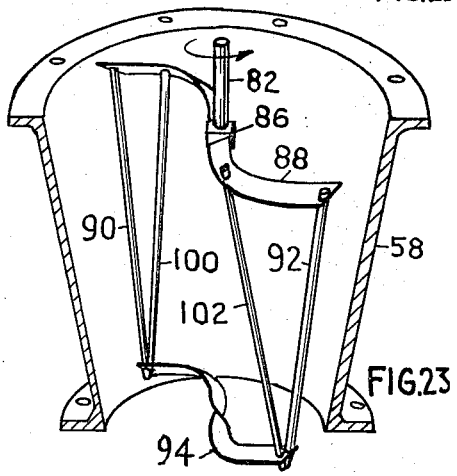
FIGURE 23 is a view, similar to that of FIGURE 20, of the hopper of FIGURES 21 and 22.
Figure 24:
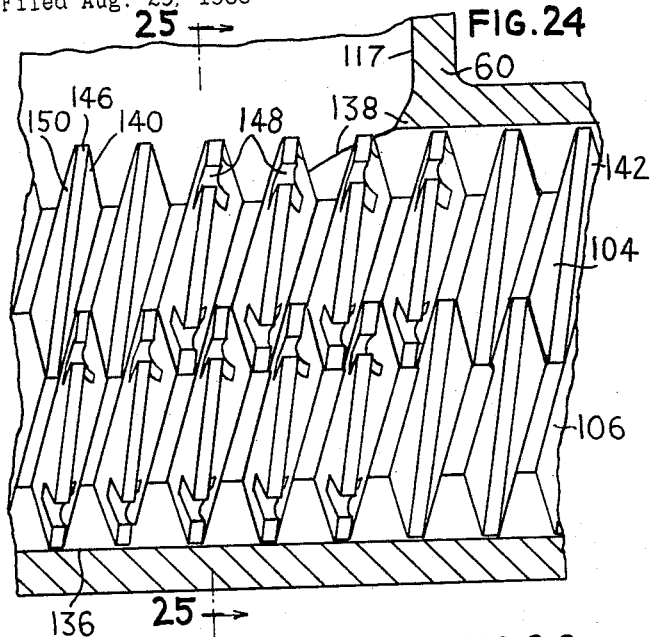
FIGURE 24 is a view, similar to that of FIGURE 3, of an alternative embodiment of feed screws which may be used with the apparatus of the invention.
Figure 25:
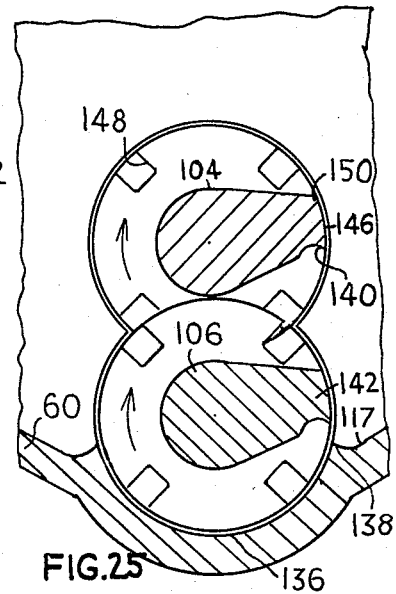
FIGURE 25 is a sectional view taken along the lines 25—25 of FIGURE 24, viewed in the direction of the arrows.

The two impellers 88 and 94 are pitched out of their horizontal planes to move the material in the compartment vertically. They are also bent in their horizontal planes to move the material inward from the walls of compartment 58. The bend can be either at only one spot (FIGURES 19 and 20) or distributed over the length (FIGURES 22 and 23).

Starting from the outer ends of the bottom impeller 94 the intermediate members 96 and 98 connect to the center of the top impeller 88 (FIGURES 1, 18, 19 and 20) while the intermediate members 100 and 102 (FIGURES 2, 21, 22 and 23) connect to the top impeller 88 at points further away from head 86, but still closer to the vertical center line than at the bottom impeller 94.

Figure 19:
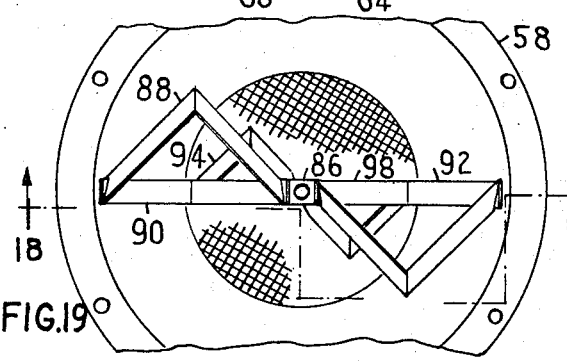
FIGURE 19 is a sectional view taken along the lines 19—19 of FIGURE 18, viewed in the direction of the arrows.
Figure 20:
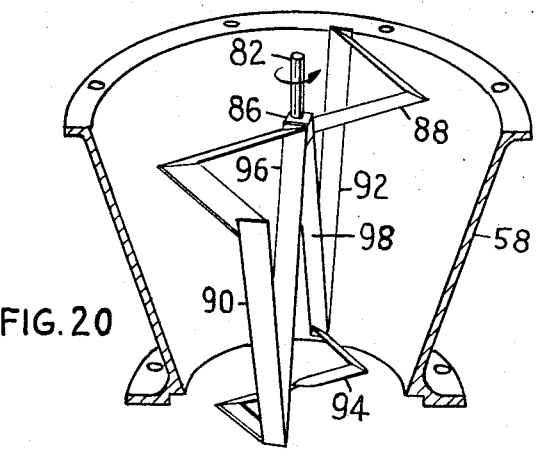
FIGURE 20 is a perspective view, partly broken away, of the hopper of FIGURES 18 and 19.

The network comprising the members 86, 88, 90, 92, 94 and either 96 and 98, or 100 and 102 when rotated by shaft 82, operates as follows: the intermediate members 96 and 98, or 100 and 102, respectively cut a conical cake out of the material, the larger bottom of which is sliced by bottom impeller 94 during each revolution of the stirrer as the cake sinks downward. The bottom impeller 94 exerts a downward force on the material just sliced, pushing it further downward, through screen 64 (FIGURES 2, 18 and 19) and providing the void into which new material can be forced. The balance of the material in the compartment 58 is a ring having the cross-section of a triangle standing on the corner with the smallest included angle. This unbalanced, unstable and top-heavy ring of material is cleared from the screen frame 66 (FIGURES 2, 18 and 21) and is forced downward by the top impeller 88 into the void developing along the intermediate members 96 and 98 or 100 and 102, respectively. At the same time the outer members 90 and 92 constantly sever the material ring from the compartment 58. The members 90, 92, 96, 98, 100 and 102 may have any cross-section. If flat, blade-like members 90, 92, 96 and 98 as shown in FIGURES 18, 19 and 20 are chosen, they should have a pitch such that the material is plowed toward the center line of rotation.

For operations in which the material contains coarse, tough particles such as pellets which are not to be screened out, the screens 62 and 64 and their screen frame 66 and 68 as well as the sifter brush 80 are removed and replaced by filler rings 101 and 103 (FIGURE 1).

At the lower end of the compartment 58, throat 60 provides space for the material discharged therefrom and for the delivery of the material into the feed screw 104 (or the feed screws 104 and 106) and the housing 108 therefor. The throat 60 may be integral with the housing 108 (all figures) or the housing and throat may be made as two or more separate parts. These constructions do not affect the principles or the teachings of the invention.

The feed screws 104 and 106 are mounted in the housing 108 so as to be rotatable about an axis of rotation. Feed screws 104 and 106 extend through the lower part of the throat 60 to receive the material discharged from the throat 60 to carry the material so discharged therealong.

Agitator 110 is a continuous, bail-like member and is mounted to two opposite mounting points 113 and 115 in the inner surface 117 of throat 60 so as to be rotatable about an axis of rotation connecting the two points 113 and 115. There is no supporting member coinciding with the axis of rotation of agitator 110 which is shaped such that it wipes the material from the inner surface 117 of the throat 60 and from the periphery of the feed screws 104 and 106.

The continuous bail-like member 110 has a clearance from the feed screws 104 and 106 which is always larger than the size of the largest particle in the material being fed to avoid jamming if a coarse, tough particle gets between the bail-like member 110 and the feed screws. The axis of rotation of the bail-like member 110 is skew to the axis of rotation of the feed screws 104 and 106.

FIGURES 16 and 17 are enlarged, partly sectional views of a hub arrangement useful with the apparatus of the invention shown in the FIGURES 4, 6, 7, 8, 12, 13, 14 and 15, to facilitate easy and quick mounting and removal of the bail-like member 110. For this purpose, the ends of the bail-like member 110 are fastened on both sides to the hubs 112, for example, by welding. The bail-like member 110, with the hubs 112 attached as shown in FIGURE 6, is then brought into its position in throat 60. The bolts 114 are then inserted through the hubs 112 into the two bores in throat 60. The sealing rings 116 and the flange sleeves 118 are tightened to the throat 60 by screws (not shown). After bringing sealing rings 116 and flange sleeves 118 into position, the axle 120 whose threaded end has the same half-round cross-section as the threaded end of bolt 114, is brought into alignment with the latter, and connected by nuts 122 and 124. The axle 120 is rotated by a suitable drive in a manner well-known in th art (details not shown).

The bail-like member 110 may have any overall shape, but a preferred contour is round, as shown in FIGURES 1, 2, 3, 4, 5, 6, 7, 8, 13 and 14, when a compartment 58 (hopper or duct) of a round cross-section is to be accommodated. If the connecting hoppers or ducts have square or rectangular cross-sections, bail-like members 110 and throats 60, as shown in FIGURES 12 and 15, must be shaped to accommodate them.

Since the bail-like member 110 is shaped such that it wipes the material not only from the inner surface 117 of the throat 60, but also from the periphery of the screws 104 and 106, the overall shape thereof contains a rounded portion 111, preferably comprising circular and straight portions, as shown in FIGURES 4, 6, 7, 8, 12, 13, 14 and 15. These portions have a clearance from the feed screws 104 and 106 which is larger than the size of the largest particle in the material being fed, to avoid jamming. A further advantage of this bail-like member 110 according to the invention is that the ends of its wiping parts are firmly connected to its rounded portions 111, rather than being exposed to bending and damage. A further improvement of the invention is the avoiding of any supporting member coincident with the axis of rotation. Such members are relatively large and obstruct the flow of material.

As an advantage of this bail-like member 110, pipes, tubes or other ducts 130 and 132 can be inserted within the rounded portion 111 conveniently, in close proximity to the feed screws (FIGURES 1, 11 and 12). Such a close proximity is often desirable, when components are to be added which tend to separate from the main component, or components which would render the material more difficult to process in equipment upstream from the feed screws. Examples are plasticizers or other additives which render the base material, which by itself may be handled by prior art equipment, extremely difficult to handle. Another example is the addition of pigments and/or carbon black which are frequently metered directly into the feed screws 104 and 106 to avoid both dust and the need for cleaning the equipment further upstream, with each change of color. In other operations such pipes are used for removing vapors, air, etc.

In FIGURES 7 and 8 two halves of two different bail-like members 110 are shown crimped in the planes thereof such that those portions of the throat 60 which are not wiped by a portion 121 of the bail-like member 110 are wiped by another portion 123 of the bail-like member 110. FIGURES 7 and 8 show the bail-like member 110 with four bails, while all other figures show two bails. While one or any greater number of bails are possible, two bails are preferable because the relatively slow speed of rotation required for the bail-like member 110 permits one to use a smaller, lighter and less expensive reduction gear with a smaller number of bails.

However, one bail does not lend itself to the use of the feature of crimping described above and shown in FIGURES 7 and 8. The crimping of the bails is advantageous because the mechanical stresses on the bail-like member 110 are at a maximum when it comes into closest proximity with the inner surface 117 of the throat 60. These mechanical stresses are immediately decreased to approximately 50%, at twice the frequency, when the bail-member 110 is crimped in its plane, as described above.

A further improvement according to the invention is the additional crimping of the bail-like member 110 in a plane transverse to the plane thereof, as illustrated by FIGURES 9, 9a and 10. While this transverse crimping may take place within the portions 121 and 123 which run essentially parallel to the inner surface 117 of the throat 60, as shown in FIGURES 9a and 10, a preferred method of transverse crimping is shown in FIGURE 9 where these portions 121 and 123 remain straight, and where transverse crimping has been achieved by torsional stresses applied to the skew portions connecting the portions 121 and 123.

The additional transverse crimping is advantageous because the material frequently contains coarse, tough particles as a component thereof and/or foreign particles, mostly of metal. When such a particle gets between any of the wiping portions 123 of the bail-like member 110 and the inner surface 117 of the throat 60 at a point where agitator 110 comes into closest proximity with inner surface 117, the particle is moved by that particular wiping portion 123 sideways into one of the recessed portions 121 of bail-like member 110. Jamming and damage to the equipment are thus avoided.

It is understood that the bail-like member 110 may have any cross-section, for example, round, oblong, etc. Wherever coarse, tough particles or foreign particles can be expected, it is preferable to use a cross-section which has at least one edge, such as a wedge shape, blade shape, triangle or square, positioned so that the edge on the bail-like member 110 approaches the inner surface 117 of the throat 60 first.

A further improvement according to the invention is a ridge 126 in the interior surface 117 of the throat 60 so that a groove 128 is formed therein, wherein the angle between the groove 128 and the inner surface 117 below the ridge 126 is not more than 90°. The ridge 126 runs from above the mounting point 113 along the interior surface 117 of the throat 60 downward below the axis of the bail-like member 110 which comes into closest proximity with the interior surface 117 of the throat 60 at the ridge 126. At this point, a particle getting between agitator 110 and inner surface 117 cannot be squeezed and jammed, but is directed by the bail-like member 110 toward the ridge 126 which diverts the particle to either side of the ridge 126, namely, either along the inner surface 117 of the throat 60 or into the groove 128 which preferably has a width larger than the size of the largest particle in the material being fed.

Since the ridge 126 runs downward from above the mounting point 113 of the bail-like member 110, coarse particles cannot get between the bail-like member 110 or its hub 112 and the interior surface 117 of the throat 60 below ridge 126 (FIGURE 16). The ridge 126 runs downward along surface 117 below the axis of the bail-like member 110, with the result that particles which get between the bail-like member 110 and the ridge 126 may also escape any jamming because they are able to move downward along the ridge 126.

It can be seen that a bail-like member 110 which is crimped in the plane thereof as described above, in combination with the ridge 126 moves a particle in this scissor-like fashion only over the length of a wiping portion 123 (FIGURES 7 and 8) after which the particle can escape into one of the recessed portions 121.

It can also be seen that a bail-like member 110 crimped additionally in a plane transverse to the plane thereof, as described above and shown in FIGURES 7, 8, 9, 9a and 10, is of further advantage in combination with the ridge 126. By crimping the wiping portions 123 to a larger angle with the ridge 126 (FIGURE 9) and the recessed portions 121 to a smaller angler with the ridge 126, a particle is moved along a wiping portion 123 in a scissor-like fashion within a greater angle thus avoiding jamming of the equipment even by particles which tend to resist movement.

A further advantage of the ridge 126 running downward becomes apparent when inserting a bail-like member 110 of overall round shape in the throat 60 (FIGURES 4, 13 and 14). The interior surface 117 of the throat 60 below the mounting point 113 is rounded and partially spherical and it preferably continues this way upward from the mounting point 113 to the ridge 126. This requires a slight contraction of the bail-like member 110 in its axial direction which causes expansion in the direction transverse to the axis of rotation. As this is done with the bail-like member 110 in a horizontal position, the space available for the transverse expansion is increased by the width of the groove 128.

A further advantage of the ridge 126 running downward is the fact that it is constantly purged by new material. This is important, for example, when changing from one material to another. It is also easier to clean than a horizontal ridge.

With most materials the bail-like member 110 is rotated so that it comes downward in the area where feed screws 104 and 106 transfer the material from the throat 60 toward the housing 108, corresponding to a clockwise rotation in FIGURES 1, 2, 3, and 11. For such materials, the ridge 126 is only needed in the forward half of the throat 60, i.e., in the right half in FIGURES 1, 2, 3 and 11. There are materials, however, on which the bail-like member 110 has a better effect when it is rotated in the opposite direction, i.e., counterclockwise in FIGURES 1, 2, 3 and 11. In such a case the ridge 126 is required in the rearward half of the throat 60, i.e., in the left half in FIGURES 1, 2, 3 and 11. To make the throat 60 useful for all materials, the ridge 126 should be made in both halves of the throat 60.

The ridge 126 runs along the interior surface 117 of the throat 60 downward below the axis of the bail-like member 110 at least to the point where the rounded portion 111 leaves the proximity of the inner surface 117 of the throat 60. The ridge 126 may end at that point or continue for part or all the distance to the line of intersection 134 with the inner surface 136 which surrounds the screws 104 and 106 closely.

If the ridge 126 continues to that line 134, it meets the three-dimensionally curved ridge 138 which has, according to the invention, an angle of intersection between the inner surface 136 surrounding the screws 104 and 106 with close clearance and the inner surface 117 approaching the screws of not more than 90° (FIGURES 1, 2, 3, 4, 5, 11, 12, 24, 25, 26, 27, 28 and 29). Thus, a coarse, tough particle which gets between the leading edge 140 of the helical flight 142 and the ridge 138 is diverted by the ridge 138 either inside or outside the inner surface 136.

In any screw apparatus, this is of critical importance for the segment 144 of that line of intersection 134 (FIGURE 5). In this segment 144, the leading edge 140 of the flight approaches the line of intersection 134 once during each revolution, when they are almost parallel. At this point, the space between leading edge 140 and line of intersection decreases to zero. Any coarse, tough particle between the leading edge 140 of the fast approaching helical flight 142 of the rotating feed screw 104, and the ridge 138 will be guided by the latter to either side. Without the ridge 138, the coarse, tough particle is wedged between the leading edge 140 and the line of intersection 134. The angle between these two lines on prior art apparatus runs from above 90° to 180°. This problem becomes more critical as the speed of rotation of the screw is increased.

An angle of not more than 90° can be obtained by having the surface 117 of the throat 60 approach the feed screws 104 and 106 so that it forms an angle of intersection of not more than 90° with the interior surface 136 which latter surrounds portions of the screws without changing the common close clearance within these portions.

The ridge 138 can be limited to those portions of the line of intersection 134 which are approached by the leading edge 140 of the helical flight 142. Whenever a reversing of the screw rotation, for any of the well known reasons, can be anticipated, it is preferable to have the ridge 138 available along the entire line of intersection 134 (FIGURES 1, 2, 3, 4, 5, 11, 12 and 13).

In the shear-like action between the helical flight 142 and the ridge 138, the counterpart of the latter is the leading edge 140 which forms an angle of intersection of less than 90° with the crest surface 146, extends from this intersection in an inward and upstream direction over not more than 25% of the depth of the helical flight 142, and then turns in inward and downstream directions toward the root of the feed screw 104. Thus, a coarse, tough particle is diverted by the ridge 138 and the edge 140, approaching each other with an angle of not more than 90°. Without this feature, a tough, coarse particle can easily jam in the wedge-shaped spaces.

Such coarse, tough particles which tend to gravely resist movement, are given a further dimension to escape jamming by means of groove 148 in the helical flight 142. Groove 148 runs between the leading edge 140 and the trailing edge 150, such that the opening in the trailing edge 150 is larger than the opening in the leading edge 140. Usually a number of grooves 148 are provided in the helical flight 142 within the front part of the throat 60. This inventive feature is of greatest advantage in segment 144, where the grooves 148 provide a further escape dimension for a particle from the wedge-shaped space between the line of intersection 134 and the leading edge 140 of the helical flight 142.

Figure 26:
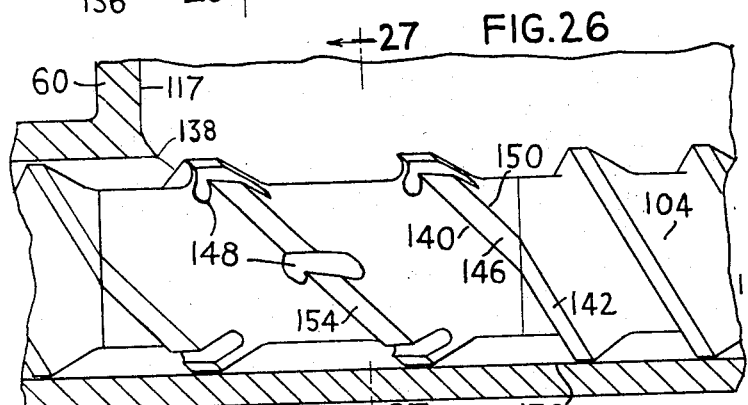
FIGURE 26 is a view, similar to that of FIGURE 3, of a further embodiment of a feed screw which may be used with the apparatus of the invention.
Figure 27:
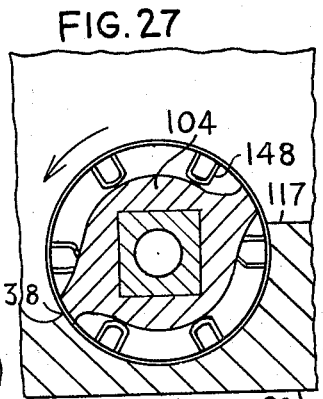
FIGURE 27 is a sectional view taken along the lines 27—27 of FIGURE 26, viewed in the direction of the arrows.
Figure 28:
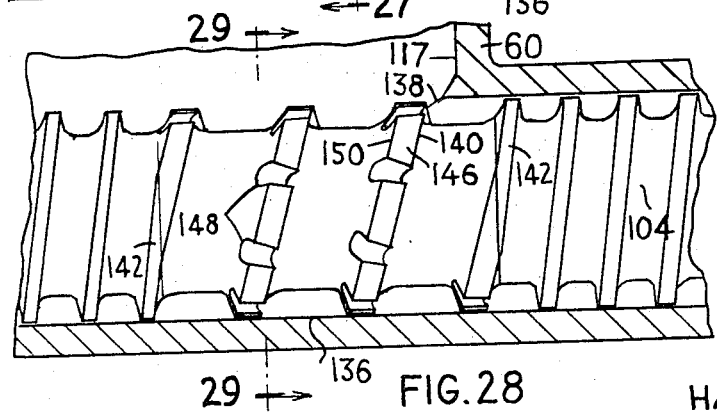
FIGURE 28 is a view, similar to that of FIGURE 3, of a still further embodiment of a feed screw which may be used with the apparatus of the invention.
Figure 29:
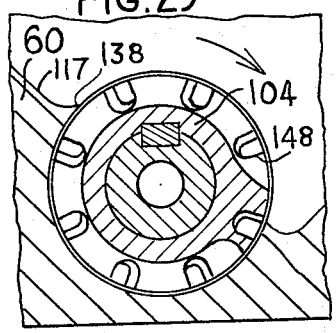
FIGURE 29 is a sectional view taken along the lines 29—29 of FIGURE 28, viewed in the direction of the arrows.

Since the groove 148 decrease the conveying efficiency of the screws 104 and 106, it is a feature of this invention to have the pitch of the portion of the helical flight 154 provided with the grooves 148 greater than the pitch of the helical flight 142 immediately adjacent thereto (FIGURES 26 and 28).

While particular embodiments of the invention have been shown and described, it is apparent to those skilled in the art that modifications are possible without departing from the spirit of the invention or the scope of the subjoined claims.

The embodiments of the invention in which an exclusive property or privilege is claimed are defined as follows:

1. Apparatus for feeding particulate material comprising:
   a compartment for receiving and containing material;
   a throat in the lower portion of the compartment located such that the material may be discharged therefrom;
   a feed screw and a housing therefor, the feed screw being mounted in the housing so as to be rotatable about an axis of rotation, the feed screw extending through the lower portion of the throat to receive the material and to carry the material therealong;
   a continuous, bail-like member mounted to two opposite mounting points on the interior surface of the throat so as to be rotatable about an axis of rotation connecting the two points without a supprting member coinciding with the axis of rotation and shaped such that it wipes the material from the inner surface of the throat and from the periphery of the screw, the continuous, bail-like member having a clearance from the feed screw larger than the size of the largest particle in the material being fed;
   the axis of the rotation of the continuous, bail-like member being skew to the axis of rotation of the feed screw.

2. Apparatus for feeding particulate material as described in claim 1 wherein the continuous, bail-like member is crimped in the plane thereof such that those portions of the throat which are not wiped by a portion of the continuous, bail-like member are wiped by another portion of the continuous, bail-like member.

3. Apparatus for feeding particulate material as described in claim 2 wherein the continuous, bail-like member is crimped in a plane transverse to the plane thereof.

4. Apparatus for feeding particulate material as described in claim 1 including:
   a ridge in the interior surface of the throat so that a groove is formed therein and wherein the angle between the groove and the interior surface of the throat below the ridge is not more than 90°;
   the ridge running from above the mounting point along the interior surface of the throat downward below the axis of the bail-like member;
   the continuous, bail-like member coming into closest proximity with the interior surface at the ridge.

5. Apparatus for feeding particulate material as described in claim 4 wherein the angle of intersection between the inner surface of the throat surrounding the feed screw with close clearance and the inner surface of the throat approaching the feed screw is not more than 90°.

6. Apparatus for feeding particulate material as described in claim 5 wherein the feed screw comprises:
   a root;

a helical flight on said root;
the helical flight comprising a leading edge, a trailing edge and a crest;
the angle between the leading edge surface and the crest surface being less than 90°.

7. Apparatus for feeding particulate material as described in claim 6 wherein the crest of the helical flight is provided with a groove between the trailing and leading edges such that the opening in the trailing edge is larger than the opening in the leading edge.

8. Apparatus for feeding particulate material as described in claim 1 including:
a network of rigid members mounted in the compartment above the throat so as to be rotatable about a vertical axis;
the network comprising;
a top impeller and a bottom impeller, both impellers being pitched out of their horizontal planes to move the material in the compartment vertically and bent in their horizontal planes to move the material inward from the compartment walls;
at least one outer member shaped to wipe the interior surface of the compartment connecting an outer end of the top impeller and an outer end of the bottom impeller; and
at least one intermediate member connected between the top impeller and the bottom impeller such that the intermediate member is closer to the vertical center line of the network at the top impeller than at the bottom impeller.

9. Apparatus for feeding particulate material as described in claim 8 including:
a ridge in the interior surface of the throat so that a groove is formed therein and wherein the angle between the groove and the inner surface of the throat below the ridge is not more than 90°;
the ridge running from above the mounting point along the interior surface of the throat downward below the axis of the bail-like member;
the continuous, bail-like member coming into closest proximity with the interior surface at the ridge.

10. Apparatus for feeding particulate material as described in claim 9 wherein the angle of intersection between the inner surface of the throat surrounding the feed screw with close clearance and the inner surface of the throat approaching the feed screw is not more than 90°; and wherein the feed screw comprises:
a root;
a helical flight on said root;
the helical flight comprising a leading edge, a trailing edge and a crest;
the angle between the leading edge surface and the crest surface being less than 90°.

11. Apparatus for feeding particulate material as described in claim 10 wherein the crest of the helical flight is provided with a groove between the trailing and leading edges such that the opening in the trailing edge is larger than the opening in the leading edge.

12. Apparatus for feeding particulate material comprising:
a compartment for receiving and containing material;
a throat in the lower portion of the compartment located such that the material may be discharged therefrom;
a feed screw extending through the lower portion of the throat into a housing and mounted therein so as to be rotatable about an axis of rotation, the feed screw being surrounded on the lower periphery thereof by one part of the throat's inner surface, of which another part approaches the feed screw below the axis thereof in an upward direction, so that said parts of the throat's inner surface meet in an intersection below the feed screw's axis, thus forming an edge of not more than 90°.

13. The invention of claim 12 wherein the feed screw comprises:
a root;
a helical flight on said root;
the helical flight comprising a leading edge, a trailing edge and a crest;
the angle between the leading edge surface and the crest surface being less than 90° within the axial length of the intersection between the throat's inner surface surrounding the periphery of the feed screw and the throat's inner surface approaching the feed screw, said intersection forming a closed loop edge of not more than 90°, the axial length of the intersection being defined as the projection thereof to the feed screw.

14. The invention of claim 13 wherein the crest of the screw flight is provided with a groove between the trailing and leading edges such that the opening in the trailing edge is larger than the opening in the leading edge.

15. Apparatus for feeding particulate material comprising:
a compartment for receiving and containing material;
a throat in the lower portion of the compartment located such that the material may be discharged therefrom;
a feed screw extending through the lower portion of the throat into a housing and mounted rotatably to receive the material and carry the material therealong, the feed screw comprising:
a root;
a helical flight on said root;
the helical flight comprising a leading edge, a trailing edge and a crest;
the angle between the leading edge surface and the crest surface being less than 90° within the screw length located between the throat's inner surfaces approaching the feed screw.

16. The invention of claim 15 wherein the crest of the feed screw flight is provided with a groove between the leading and trailing edges such that the opening in the trailing edge is larger than the opening in the leading edge.

17. A feed screw for apparatus for feeding particulate material comprising:
a root;
a helical flight on said root;
said helical flight having a leading edge, a trailing edge and a crest;
a groove in a portion of the crest of the flight between the leading and trailing edges;
the opening in the groove at the trailing edge being larger than the opening therein at the leading edge.

18. The invention of claim 17 wherein the pitch of the portion of the helical flight provided with the groove is greater than the pitch of the helical flight immediately adjacent thereto.

19. In apparatus for feeding particulate material having a compartment for receiving the material, a throat in the lower portion of the compartment, a stirrer comprising:
a network of rigid members mounted in the compartment above the throat so as to be rotatable about a vertical axis;
the network comprising:
a top impeller and a bottom impeller, both impellers being pitched out of their horizontal planes to move the material in the compartment vertically and bent in their horizontal planes to move the material inward from the compartment walls;
at least one outer member shaped to wipe the interior surface of the compartment connecting an outer end of the top impeller and an outer end of the bottom impeller; and
at least one intermediate member connected between the top impeller and the bottom impeller such that the intermediate member is closer to the vertical center line of the network at the top impeller than at the bottom impeller.

References Cited

UNITED STATES PATENTS

| | | | |
|---|---|---|---|
| 50,916 | 11/1865 | Davis | 222—412 X |
| 1,152,820 | 9/1915 | Kennicott | 222—236 |
| 1,458,979 | 6/1923 | Howe et al. | 222—235 |
| 1,915,950 | 6/1933 | Pickard et al. | 198—213 |
| 2,032,338 | 2/1936 | Anderson | 198—213 X |
| 2,141,691 | 12/1938 | Kirby | 222—412 X |
| 2,303,584 | 12/1942 | Schweickart | 198—213 |
| 2,438,301 | 3/1948 | Schulte | 198—213 X |
| 2,499,929 | 3/1950 | Nelson et al. | 198—213 |
| 2,608,395 | 8/1952 | August | 198—214 X |
| 2,687,830 | 8/1954 | Doering | 222—227 |
| 2,733,051 | 1/1956 | Street | 222—413 |
| 2,782,963 | 2/1957 | Erdmenger | 222—236 X |
| 3,136,454 | 6/1964 | Kempton | 222—413 X |
| 3,142,419 | 7/1964 | Burke | 222—413 X |
| 3,251,512 | 5/1966 | Irving | 222—227 X |

FOREIGN PATENTS 35,158   11/1908   Austria.

SAMUEL F. COLEMAN, *Primary Examiner.*